United States Patent [19]

Bock

[11] Patent Number: 5,700,035
[45] Date of Patent: Dec. 23, 1997

[54] FORCE LIMITER FOR VEHICLE SAFETY BELT SYSTEMS

[75] Inventor: Heinz Bock, Heubach, Germany

[73] Assignee: TRW Occupant Restraint Systems GmbH, Alfdorf, Germany

[21] Appl. No.: 572,004

[22] Filed: Dec. 14, 1995

[30] Foreign Application Priority Data

Dec. 19, 1994 [DE] Germany .................. 44 45 322.1

[51] Int. Cl.⁶ ............................................ B60R 22/28
[52] U.S. Cl. .................................. 280/805; 297/470
[58] Field of Search ........................ 280/805; 297/470, 297/471, 472; 188/371

[56] References Cited

U.S. PATENT DOCUMENTS 3,195,685 7/1965 Blackstone .
3,486,791 12/1969 Stoffel et al. .
4,027,905 6/1977 Shimogawa et al. .

FOREIGN PATENT DOCUMENTS 1506641 10/1969 Germany .
9416120 12/1994 Germany .
38833 9/1974 Japan .
84855 12/1979 Japan .
25152 8/1981 Japan .
62255 10/1990 Japan .

*Primary Examiner*—Brian L. Johnson
*Assistant Examiner*—Jonathan E. Butts
*Attorney, Agent, or Firm*—Tarolli, Sundheim, Covell, Tummino & Szabo

[57] ABSTRACT

A force limiter for vehicle safety belt systems which is inserted in the force flow path of the safety belt system by means of two fittings (26, 32), the distance between the fittings (26, 32) being able to be increased with a conversion of energy. In the context of such a force limiter the characteristic of the tensile force effective between the two fittings is to be rendered adjustable along the deformation displacement over a wide range. This is achieved since a first one (26) of such fittings is fixedly connected with the metal frame (20) having a deflection pin (22) arranged therein and a second one (32) of the fittings is fixedly connected with a first end of a metal strip (30), which is adapted to be drawn about the pin (22) along a positively set path. Owing to such configuration it is possible for the characteristic of the force limiter to be selected by the designer within a wide range independently of the threshold value as from which the force limiter takes effect.

6 Claims, 2 Drawing Sheets

FORCE LIMITER FOR VEHICLE SAFETY BELT SYSTEMS

BACKGROUND OF THE INVENTION

The present invention relates to a force limiter for vehicle safety belt systems intended to be inserted in the force flow path of the belt.

Such a force limiter is utilized in safety belt systems to reduce by energy conversion the peak loads in the belt webbing occurring during a crash to a degree which will not injure a vehicle occupant, by the deformation of the force limiter when the value of the tensile force, which is applied via the belt webbing, exceeds a certain threshold value. For instance such energy conversion may be provided for between an attachment point on the vehicle body and the belt buckle of the safety belt system.

An important criterion for the design of such a force limiter is on the one hand the threshold value, as from which the force limiter is effective, and on the other hand the characteristic of a force acting between the fittings involving a change in length between the two fittings. In a fashion dependent on the overall design of the occupant restraining system and the deformation properties of the vehicle it is possible here to provide for different characteristics, as for example characteristics with a high threshold value and then a constant force evolution along the deformation displacement or characteristics with a low threshold value and a progressive force evolution. Simultaneously care should be taken to see that the force limiter is dimensioned so that at the end of the deformation displacement provided for by the designer will have sufficient strength.

One object of the invention is to provide a force limiter whose threshold value as from which the force limiter is effective and the tensile force characteristic along the deformation displacement can be reproducibly adjusted within a wide range by mere selection of shape dimensions and material.

SUMMARY OF THE INVENTION

According to the invention, a force limiter is provided for insertion into the path of force flow of the belt by means of two end fittings. A first one of such fittings is fixedly joined to a metal frame in which a pin is mounted, and a second one of the fittings is connected with a first end of a metal strip. The metal strip is arranged and adapted to be drawn about the pin along a forcibly guided path. By selection of a suitable configuration of the metal strip this design renders possible a free selection of the characteristic of the force limiter in accordance with the invention in a wide range in a manner substantially independent of the threshold value as from which the force limiter becomes operative.

BRIEF DESCRIPTION OF THE DRAWING

Preferred embodiments of the invention will now be described with reference to the accompanying drawings.

DESCRIPTION OF THE PREFERRED EMBODIMENTS

Figure 1:
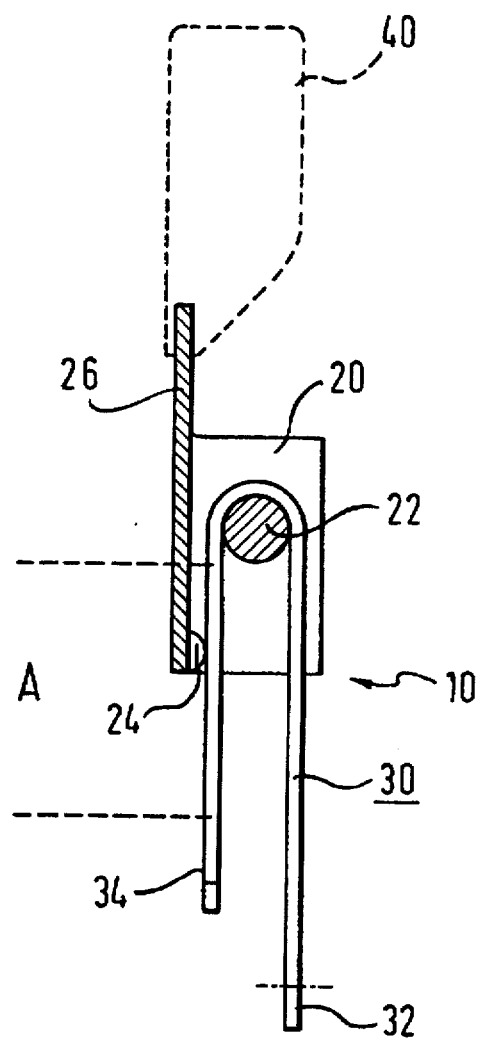
FIG. 1 shows a force limiter in accordance with the invention in a diagrammatic partly sectioned side elevation.

FIG. 1 shows a force limiter 10 in accordance with the invention in a partially sectioned, diagrammatic side elevation. The force limiter 10 includes a metal frame 20, which is preferably in the form of a bent sheet metal component. The metal frame 20 has a U-like configuration, of which the limb, which is behind the section plane in terms of FIG. 1, and the sectioned middle part are seen. The middle part is provided with an extension, which constitutes the first fitting 26, on which a belt buckle 40 is attached as shown diagrammatically in dashed lines in FIG. 1. On the end opposite to the belt buckle 40 the middle part of the metal frame 20 is provided with a support 24, whose function will be explained below.

Figure 2:
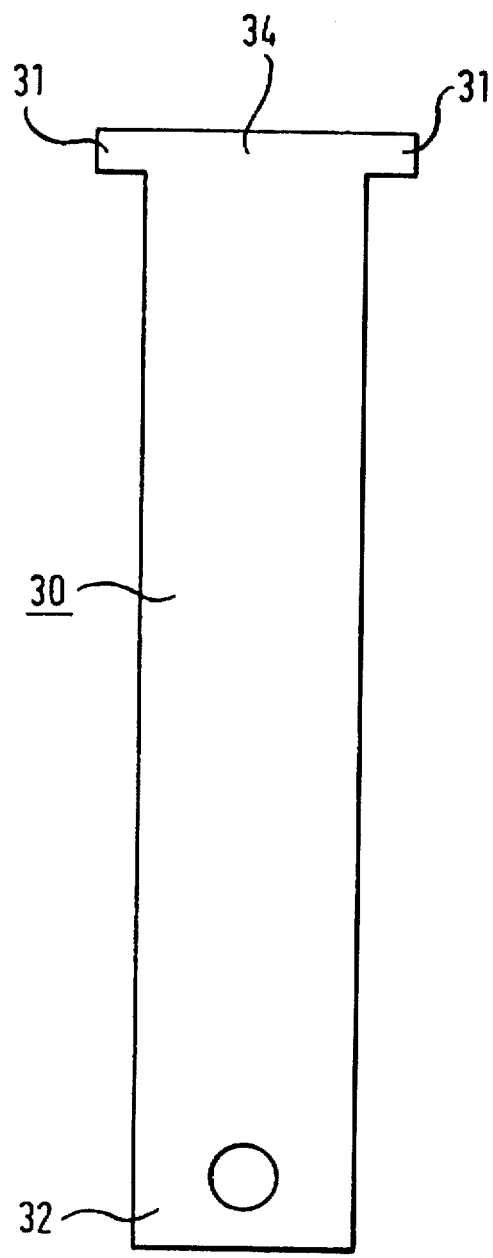
FIG. 2 shows the metal strip of the force limiter of FIG. 1 in the unwinded form thereof.

Between the two limbs of the metal frame 20 a deflection pin 22 is mounted. A metal strip 30 is so trained about this pin 22 that between its first end in the form of a fitting 32 and its second end 34 it is deflected through essentially 180°. Between the second end 34 of the metal strip 30 and the section of the metal strip 30 which is trained around the pin 22, the support 24, which is arranged on the middle part of the metal frame 20, engages one side of the metal strip 30 which faces away from the pin. In order to prevent the metal strip 30 from being completely drawn out of the metal frame 20, the second end 34 of the metal strip 30 is provided with, for example, projections 31 on its narrow sides (see FIG. 2) which toward the end of the deformation displacement of the force limiter 10 come to abut the metal frame and hence limit the deformation displacement. The metal strip 30 is preferably a bent sheet metal component.

The force limiter 10, which via its two fittings 26 and 32 is inserted in the force flow path of the safety belt, acts in the following manner if there is a crash: once the tensile force effective between the two fittings 26 and 32 has exceeded a predetermined threshold value, the sum of the friction force acting between the metal strip 30 and the deflection pin 22 and the inhibiting force produced by the resistance to flexure of the metal strip 30 will be overcome, whereupon the metal strip 30 will be drawn about the pin 22 downward in terms of FIG. 1 through the metal frame 20. During such event the presence of the support 24 and the tensile force acting on the second fitting 32 will force the metal strip 30 to follow a predetermined path. Owing to the movement of the metal strip through the metal frame 20 the distance between the two fittings 26 and 30 will be increased with a conversion of energy owing to plastic deformation and development of frictional heat so that the tensile force effective between the fittings can be limited to a degree predetermined by the designer, the characteristic of changes in tensile force along the deformation displacement being able to be represented in the form of a diagram.

Figure 3A:
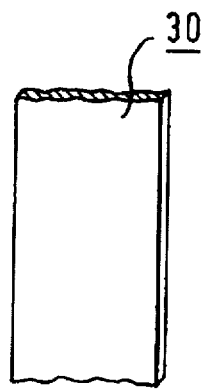
FIGS. 3, 4 and 5 show various different configurations of the part, denoted A in FIG. 1, of the metal strip and the respective characteristics.

The characteristic of the changes in tensile force along deformation displacement or path may be set in a particularly simple manner by means of the design of the part, denoted as A in FIG. 1, of the metal strip 30. In FIGS. 3a through 5a different designs of such part of the metal strip 30 are depicted whereas in FIGS. 3b through 5b the characteristics for such designs are represented. In FIG. 3a the metal strip 30 is represented in the part A with a constant width so that after attaining the threshold value for the tensile force between the two fittings there will be a substantially constant force F along the deformation path s until toward the end of the deformation path s the tensile force F will sharply increase (see FIG. 3b) owing to the cooperation of the second end 34 of the metal strip 30 with the metal frame 20.

Figure 4A:
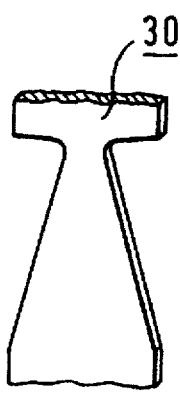
Figure 4B:
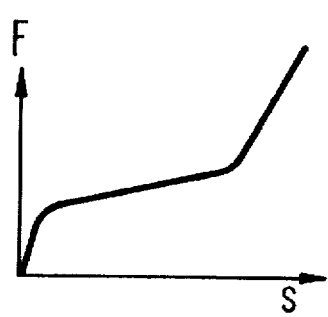
Figure 5B:
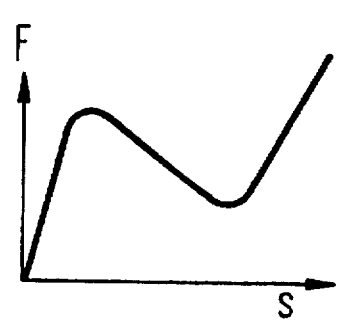

In FIG. 4a the metal strip 30 has its part A designed with a width increasing between the section engaging the pin 22 and the second end 34 so that a relatively low threshold value for the tensile force will be set. As shown in FIG. 4b, after reaching this threshold value the tensile force F will increase along the deformation displacement s steadily until, in the same fashion as in the embodiment of FIG. 3, the force will sharply increase toward the end of the deformation displacement s.

Figure 5A:
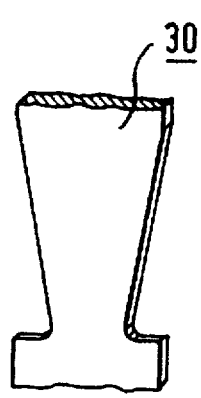
Figure 3B:
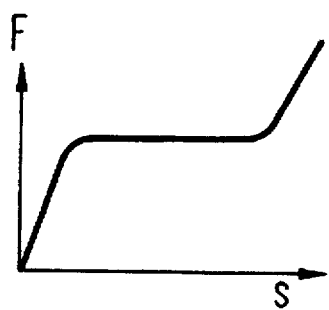

In FIG. 5a the metal strip 30 is represented with a part A whose width decreases between the section engaging the pin 22 and the second end 34. Owing to this design there will be a relatively high threshold value for the tensile force between the fittings until the force limiter takes effect, the tensile force F decreasing after reaching such threshold value along the deformation displacement. In the same way as in the embodiment of FIGS. 3 and 4 this is then followed by an increase in the tensile force, toward the end of the deformation displacement, caused by the cooperation of the second end 34 of the metal strip 30 with the metal frame 20.

Figure 6A:
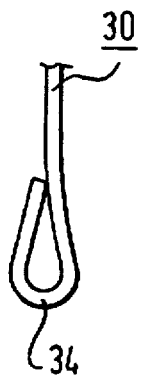
FIGS. 6a through 6c show different configurations of the second end of the metal strip.
Figure 6B:
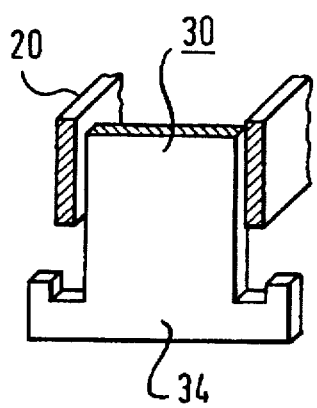
Figure 6C:
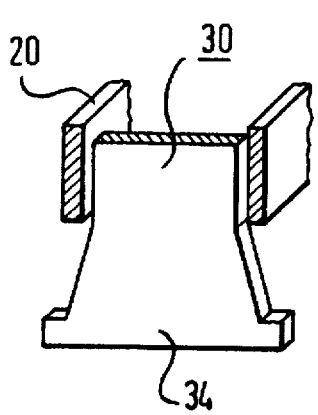

The function of the projections described above may also be assumed by other configurations of the second end 34 of the metal strip 30. Examples for such a design are represented in FIGS. 6a through 6c. In this respect the configuration illustrated in FIG. 6b is the same as that of FIG. 2, albeit with the modification that the projections formed on the second end 34 of the metal strip are furnished with two hooked extensions. In this embodiment, just like the embodiment of FIG. 2, the deformation path of the force limiter is limited by engagement of projections, which are designed to extend athwart the deformation displacement of the force limiter member 10, by abutment taking place between the end 34 of the metal strip 30 and the metal frame 20.

In the designs illustrated in FIGS. 6a and 6b the deformation displacement of the force limiter 10 involves a clamping action between the end 34 of the metal strip 30 and the metal frame 20. In FIG. 6a an embodiment will be seen, in which the end 34 of the metal strip 30 is folded back onto the same. The overall thickness of the metal strip 30, which is greater in size than the gap between the pin 22 and the middle part of the metal frame 20, accordingly limits the deformation displacement of the force limiter 10 by cooperation with the middle part of the metal frame 20 and the pin 22.

In FIG. 6c an embodiment is depicted in which the width of the metal strip 30 at the end 34 thereof successively increases. Toward the end of the deformation displacement there is accordingly a clamping action between the ribs of the U-like metal frame 20 and the metal strip 30, such clamping action opposing further withdrawal of the metal strip 30 from the metal frame 20 with an increasing resistance. Unlike the embodiments of FIGS. 2 and 6a, 6b, in which the deformation displacement is limited by a sort of abutment action, in the embodiment of FIG. 6c the deformation displacement of the force limiter is limited in a relatively gentle manner.

What is claimed is:

1. An apparatus for limiting a force applied by a seat belt webbing to an occupant of a vehicle which arises in the event of a vehicle collision due to movement of the occupant against the seat belt webbing creating a tensile force in the seat belt webbing, said apparatus comprising:

a metal frame having a U-shape formed by a base plate and a pair of spaced apart side plates, said base plate including first and second end portions;

said base plate including a support which extends adjacent said second end portion of said base plate between said pair of side plates;

a stationary cylindrical deflection pin extending between said pair of side plates, said deflection pin being spaced from said base plate and being located intermediate said first and second end portions of said base plate; and a metal strip having first and second end portions and opposing first and second flat side surfaces, said strip extending approximately 180° around said deflection pin such that said first and second end portions of said strip lie parallel to one another and are spaced apart, said first flat side surface engaging said deflection pin and said second flat side surface engaging said support on said base plate;

said first end portion of said base plate being connected with the seat belt webbing to transmit the tensile force in the seat belt webbing as well as movement of the seat belt webbing caused by the occupant moving against the seat belt webbing into relative movement between said frame and said strip;

said first flat side surface of said strip being frictionally slidable on said deflection pin in response to relative movement of said frame and said strip to dissipate a portion of the tensile force in the seat belt webbing;

said support on said base plate engaging and guiding said second flat side surface of said strip during relative movement of said frame and said strip;

said strip being plastically deformed upon relative movement of said frame and said strip to further dissipate the tensile force in the seat belt webbing.

2. The apparatus as set forth in claim 1 wherein said second end portion of said strip includes a pair of projections disposed on opposite lateral edges of said strip for engaging said side plates of said frame during relative movement of said frame and said strip to terminate the relative movement and to prevent complete withdrawal of said strip from said frame.

3. The apparatus as set forth in claim 2 wherein said strip has a tapered portion adjacent said second end portion, said tapered portion increasing in width towards said pair of projections at said second end portion, said lateral edges of said strip in said tapered portion engaging said side plates of said frame during relative movement of said frame and said strip to terminate the relative movement in a gradual manner.

4. The apparatus as set forth in claim 1 wherein said first end portion of said strip is fixedly secured to the vehicle.

5. The apparatus as set forth in claim 4 wherein said frame moves in response to movement of the seat belt webbing.

6. The apparatus as set forth in claim 1 wherein said support has a semi-circular cross-section and said strip tangentially engages an outer surface of said support.

* * * * *